United States Patent [19]

Drees et al.

[11] Patent Number: 5,778,683
[45] Date of Patent: Jul. 14, 1998

[54] THERMAL STORAGE SYSTEM CONTROLLER AND METHOD

[75] Inventors: Kirk H. Drees, Cedarburg, Wis.; James E. Braun, West Lafayette, Ind.

[73] Assignee: Johnson Controls Technology Co., Plymouth, Mich.

[21] Appl. No.: 565,441

[22] Filed: Nov. 30, 1995

[51] Int. Cl.$^6$ .................................................. F25D 3/00
[52] U.S. Cl. ................................ 62/59; 62/99; 62/185; 62/201
[58] Field of Search ................................ 62/185, 59, 201, 62/99, 180, 434, 435, 436, 437; 165/10, 902

[56] References Cited

U.S. PATENT DOCUMENTS

| 4,314,454 | 2/1982 | Kamejima et al. ................ 62/201 X |
| 4,513,574 | 4/1985 | Humphreys et al. ................ 62/59 |
| 4,916,909 | 4/1990 | Mathur et al. . |
| 5,090,207 | 2/1992 | Gilbertson et al. ................ 62/185 X |

*Primary Examiner*—Harry B. Tanner
*Attorney, Agent, or Firm*—Quarles & Brady

[57] ABSTRACT

An thermal storage system controller implements a near optimal control strategy for minimizing energy and demand costs. A system performance variable is determined and evaluated under a given set of environmental conditions for selecting one of a plurality of control strategies.

19 Claims, 3 Drawing Sheets

THERMAL STORAGE SYSTEM CONTROLLER AND METHOD

FIELD OF THE INVENTION

The present invention relates generally to thermal storage systems and more particularly to a controller and method for controlling a thermal storage system.

BACKGROUND OF THE INVENTION

Many electric companies lack sufficient generating capacity to produce enough electricity to meet peak consumer demands. Because of the enormous capital and environmental costs associated with building new power plants, these utilities offer incentives to their customers to reduce peak electrical consumption. One of the primary goals is to shift the electrical energy consumed during weekdays to the off-peak night time and weekend periods when the utilities have excess generating capacity. This objective of flattening out the time dependent electrical usage is commonly referred to as "demand limiting".

The principle incentive used by utility companies to encourage commercial customers to shift their pattern of electrical usage is the utility rate structure. The rate structure will include one or more penalty functions designed to discourage high energy consumption during high demand time periods.

Commercial customers are typically billed based upon the energy consumed (kilowatt-hours, kW-h) and the peak demand (kilowatts, kW). Energy consumption costs are obtained by integrating the product of the energy consumption rate and the energy rate over the billing period. Demand is the average instantaneous power consumed over a 1 to 15 minute interval (depending on the rate structure). The peak demand is the maximum demand incurred over a particular billing period. Billing periods are generally based on a monthly cycle, although some utility companies will extend the billing period used to calculate the demand cost for up to one year. Demand costs are computed by multiplying the maximum demand incurred during the billing period by the demand charge. In addition, to this obvious penalty for having a high demand, energy rates and demand charges are often adjusted based on the time of use (TOU) to further motivate the customer to shift electrical consumption from higher rate "on-peak" time periods to lower rate "off-peak" time periods. The sum of the energy and demand costs is the amount paid by the customer.

Thermal storage systems provide one method for shifting on-peak electrical usage associated with building cooling requirements to off-peak times. A thermal storage system consists of a storage media integrated into a chilled water or brine cooling system. A control system provides for charging and discharging the thermal storage system. Generally the control system provides for charging the storage system, i.e. extracting heat from the storage system, during off-peak time periods and when building cooling loads are low and for discharging the storage system during on-peak time periods and when the building cooling loads are high.

One type of thermal storage system which is becoming more popular uses ice as a storage medium. The many attributes of an ice storage system include having a high energy storage capacity to volume ratio (8267 Btu/ft$^3$), non-toxicity, and a melting temperature which works well for air conditioning applications. Ice storage tanks may also be made modular which makes them easier to incorporate into retro-fit applications than, for example, chilled water tanks. The primary disadvantage of storing ice, compared to chilled water or eutectic salts, is a reduction in chiller COP attributed to the low evaporator temperatures required to make ice.

In some installations the chiller and thermal storage media are sized to have adequate capacity so that the entire on-peak building cooling load can be met entirely from the storage system. These types of systems are often referred to as "full storage systems". More often the chiller and thermal storage media are selected such that only a portion of the on-peak load is met from the storage system with the remainder of the load being met from a chiller. These types of systems are often referred to as "partial storage systems". With a full storage system the chiller is not operated during the on-peak period making the control strategy for the system very simple. In contrast, the control strategy for a partial storage system is typically complex accounting for operating the chiller during the on-peak time period and discharging the storage system with these systems being related by several time varying variables.

Several control strategies have been proposed for ice storage systems each involving slight modifications to several basic control schemes. The most prevalent control strategy is chiller priority control (CPC). During the off-peak, low building cooling load period, the chiller is operated at maximum capacity until the ice storage tanks are fully charged. During the on-peak, high building load period, the chiller is operated to satisfy the entire cooling load. The storage tanks are used to supplement the chiller when the building load exceeds the chiller capacity. While this strategy is simple to implement, it suffers the disadvantage of yielding relatively high energy and demand costs for days with lower cooling loads.

In contrast to CPC, storage priority control (SPC) strategies place emphasis on satisfying the on-peak cooling load solely from the storage medium. During the off-peak periods, the chiller is operated at maximum capacity until the ice storage tanks are fully charged. During the on-peak period building load is met by attempting to completely melt the ice within the storage tanks. The chiller is operated at reduced capacity which provides for completely melting the ice at the end of the on-peak period. SPC strategies can significantly reduce both energy and demand costs, however, reducing energy and demand costs depends on the discharge strategy and the accuracy of the forecasting algorithm. Depleting the ice before the end of the on-peak period an increase in the demand cost or an inadequately cooled building. Excess ice at the end of the on-peak period results in higher energy and demand costs than if all the ice were melted.

In a special case of SPC, referred to as load limiting control (LLC), the chiller is run at maximum capacity during the off-peak period until the storage medium is fully charged or the period ends. The chiller is operated according to a CPC strategy during this period. For on-peak, the chiller is operated at a constant capacity such that the ice is completely depleted at the end of the on-peak period. Again, LLC requires a forecasting algorithm to determine cooling load during the on-peak period for establishing a chiller capacity setpoint.

Another control strategy is described in U.S. Pat. No. 4,916,909. This control strategy also incorporates complex forecasting algorithms and control heuristics to determine a control strategy for lowering utility costs. This strategy likewise suffers the disadvantage of requiring multiple complex forecasting algorithms for long term billing periods. In addition, the strategy is very complex requiring processing of very large amounts of information.

Ideally one desires to implement an optimal control strategy which minimizes the integrated energy and peak demand costs incurred over an entire billing period. The optimal solution, however, requires perfect knowledge of future conditions. Since it is not possible to accurately forecast more than one day in advance, and only marginally effective to forecast 15–24 hours in advance, a true optimal solution is not realistic. Hence there is a need for an easily implemented controller for a thermal storage system which provides near optimal results for minimizing energy and demand costs while requiring only a short-term forecasting algorithm.

SUMMARY OF THE INVENTION

In a preferred embodiment of the present invention, a controller provides near optimal control for charging and discharging a thermal storage system. The controller implements heuristics to determine a near optimal daily control strategy with regard to minimizing energy costs subject to a demand cost limit. Further heuristics are employed for setting the demand limit for the first day of a billing period.

In another aspect of the present invention a method of controlling a thermal storage system results in near optimal performance. Monthly controls are employed to select a demand limit for a billing period. Daily control heuristics are then employed to identify near optimal control strategies with regard to minimizing energy and demand costs.

DETAILED DESCRIPTION OF A PREFERRED EMBODIMENT

Figure 1:
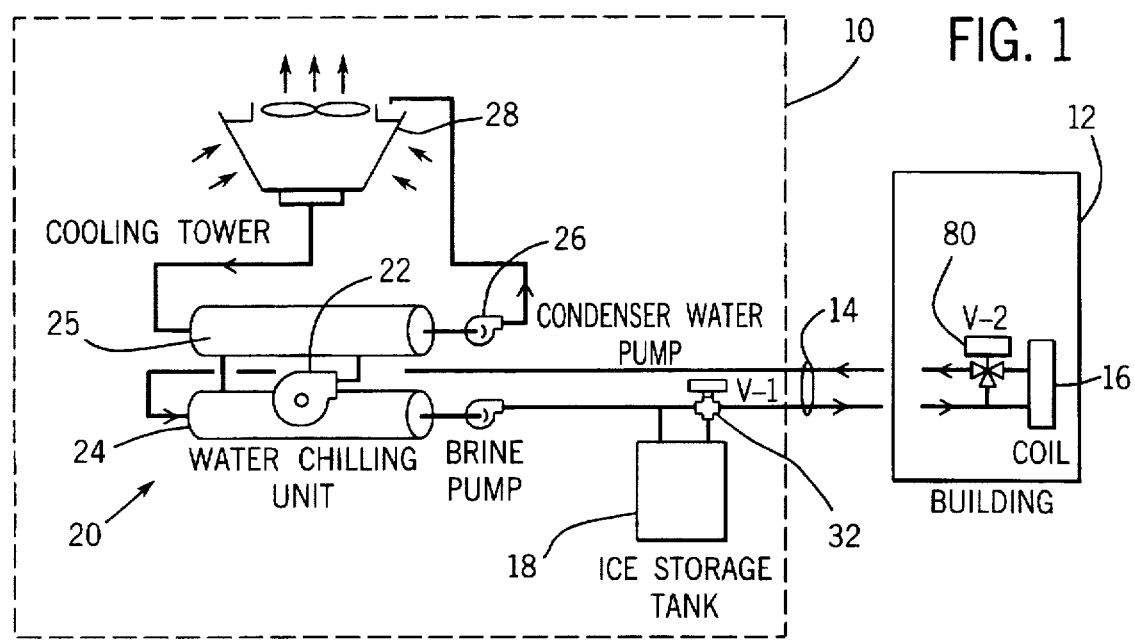
FIG. 1 is a diagram of an ice storage system adaptable for use with the controller of the present invention.

As illustrated in FIG. 1, a thermal storage system 10 is coupled to provide cooling to building 12. Thermal storage system 10 includes an ice storage tank 18 and a water chilling unit 20 including compressor 22, evaporator 24, condenser 25, condenser pump 26 and cooling tower 28. Pipes 14 interconnect water chilling unit 20 with ice storage tank 18 and cooling coils 16 within building 12. Within building 12, the brine is selectively passed through coils 16 by way of three-way valve 30 for providing cooling to building 12 in a known manner.

During a cooling cycle an approximately 25% ethylene glycol and water solution ("brine") is circulated between storage system 10 and building 12 via pipes 14. More particularly, the brine is chilled by water chilling unit 20 and pumped through or around ice storage tank 18 and then to building 12 to provide cooling. During a cooling cycle, brine flows through cooling coils 16 and is modulated, in a known manner, by valve 30.

Ice storage tank 18 is shown preferably located downstream of water chilling unit 20 to allow water chilling unit 20 to operate at its highest leaving brine temperature set point and thereby improving water chiller 20 performance. During a charging cycle, three-way valve 32 is configured such that the entire flow of brine is first passed through ice storage tank 18 to maximize the charging rate. During discharge, a flow is established at cooling coils 16 and valve 32 is modulated as required to maintain the desired supply brine temperature to building 12.

Ice storage tank 18 is preferably shown as an indirect internal melt ice storage tank. The system is characterized as indirect because ice is not directly formed on evaporator 24 but is formed remotely in ice storage tank 18 via the flow of brine. The system is internal in that ice forms on pipes or tubes (not shown) located within ice storage tank 18 creating an ice formation (not shown). During discharge, a warm brine solution is passed through pipes 14 and the ice melts at the interior of the ice formation. As the ice formation melts, heat is extracted from the brine and the cool brine is communicated to building 12. It should be understood that thermal storage system 10 may be a direct type system wherein ice is formed directly on the evaporator of the chilling unit in, for example, an ice harvesting or ice on pipe type arrangement and/or an external system wherein the ice formations melt from the exterior such as in an ice on pipe arrangement.

Figure 2:
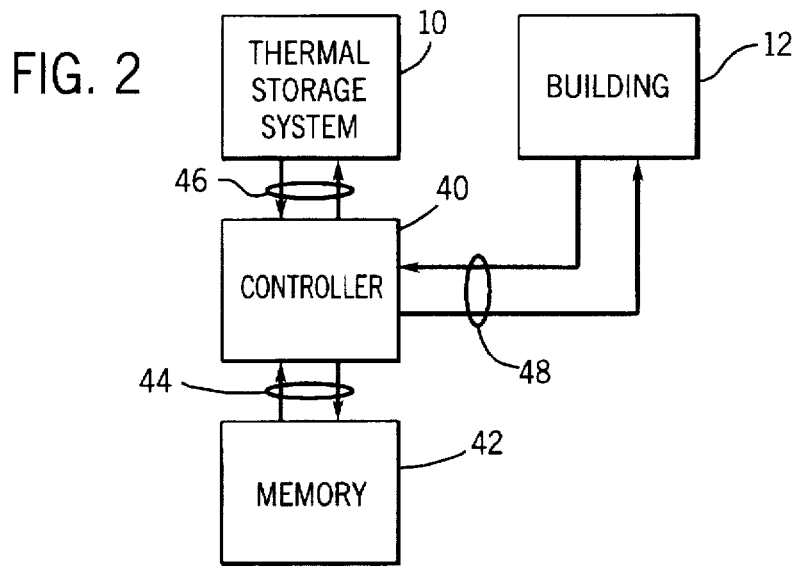
FIG. 2 is a block diagram illustrating an ice storage system controller in accordance with the present invention.

Referring now to FIG. 2, a controller 40, preferably a microprocessor based controller, is coupled to memory 42 via bus 44. Controller 40 is further coupled to send and receive data between thermal storage system 10 and building 12 via busses 46 and 48 respectively. In the present invention, controller 40 is operable, according to a preferred control strategy, for controlling water chiller unit 20 operation for providing cooling to building 12 and for charging and discharging ice storage tank 18. The control strategy, as described below, is preferably implemented as a procedure retained in memory 42 for directing operation of controller 40.

Figure 3:
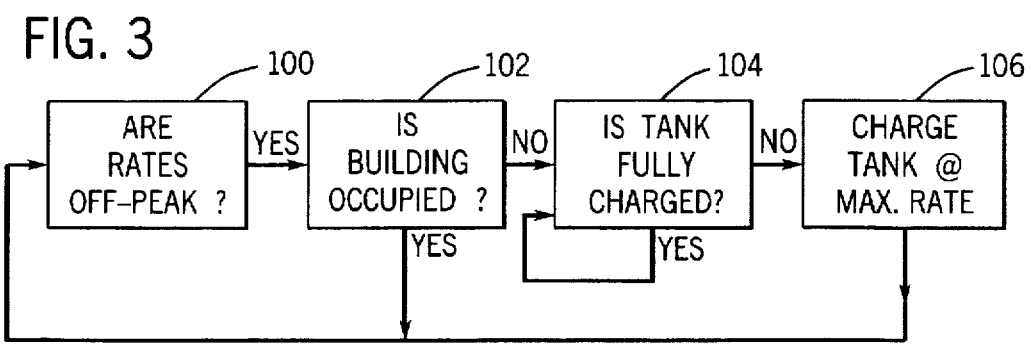
FIG. 3 is a flow chart illustrating an ice storage system charging strategy in accordance with the present invention.

With reference to FIG. 3, controller 40 directs charging of ice storage tank 18 in accordance with a preferred method illustrated. At step 100, controller 40 determines if rates are off-peak. This may be accomplished by providing within memory 42 a table of utility rates. Utility rates may also be obtained realtime from the utility via a data transfer network (not shown). If the rates are "off-peak" the method proceeds to step 102 where the controller 40 determines if building 12 is occupied, that is, if building 12 is in a cooling load cycle. If building 12 is occupied, the method returns to step 100. Otherwise, the method proceeds to step 104. At step 104, controller receives data from thermal storage system 10 as to the status of ice storage tank 18. If ice storage tank is fully charged, the method remains at this step pending a change in status. Otherwise, ice storage tank 18 is not fully charged, and controller 40 by sending signals to thermal storage unit 10, and particularly water chilling unit 20 and valve 32, charges ice storage tank 18 at the maximum charge rate. Controller 40 will always recharge ice storage tank 18 to its high limit during the off-peak period to ensure that sufficient ice inventory is available for the next cooling period without a forecaster. There is no penalty for fully charging an internal melt tank as standby heat gains do not depend on state of charge because ice storage tank 18 remains at 32° fahrenheit (F.) regardless of how much ice is present.

Some systems, such as external melt systems, may incur recharge penalties during recharge of a partially discharged storage tank. In these cases, it is best to fully discharge the storage tank during the cooling period. In this case, controller 40 would include a forecaster to predict the next day's hourly loads. As previously stated, forecasting is accurate to only about one day in advance. The forecaster provides controller 40 with an estimate of the next cooling period building load from which a fractional ice inventory is determined as the minimum of a fully charged ice storage tank and a ratio of the estimated cooling load to the total storage capacity.

Figure 4:
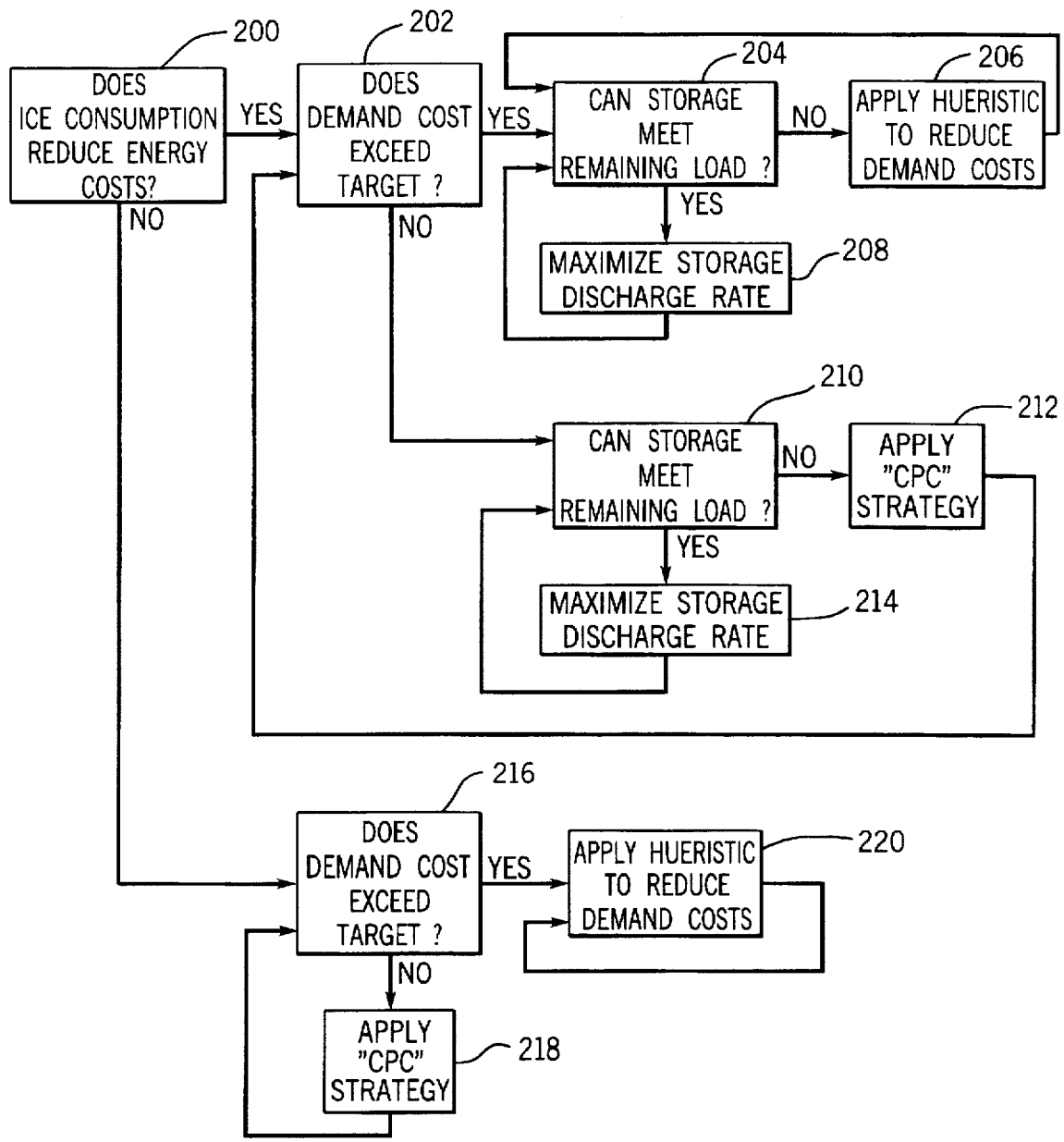
FIG. 4 is a flow chart illustrating an ice storage system discharging strategy in accordance with the present invention.

With reference now of FIG. 4, controller 40 directs discharge of ice storage tank 18 in accordance with a preferred method illustrated. The preferred method employs heuristics to select from a plurality of optimal control strategies to execute based upon given system and environmental conditions. For purposes of describing a preferred embodiment of the present invention, FIG. 4 illustrates a method in which a selection is made between one of two strategies. The first strategy is applicable if the consumption and subsequent manufacture of ice within ice storage tank 18 lowers energy costs. The second is applicable if ice making and consumption increases energy costs. A selection between the two strategies is made at step 200.

At step 200, controller 40 determines if ice consumption reduces energy costs. This determination is dependent on the performance of water chilling unit 20 and the ratio of on-peak to off-peak energy rates (ECR). When the ECR is high, energy costs are lowered by exhausting as much ice as possible during the on-peak period and replenishing the ice during the lower cost off-peak period. If the ECR is low, only the minimum amount of ice needed to supplement a CPC strategy or maintain the demand cost below its target value should be consumed.

Figure 5:
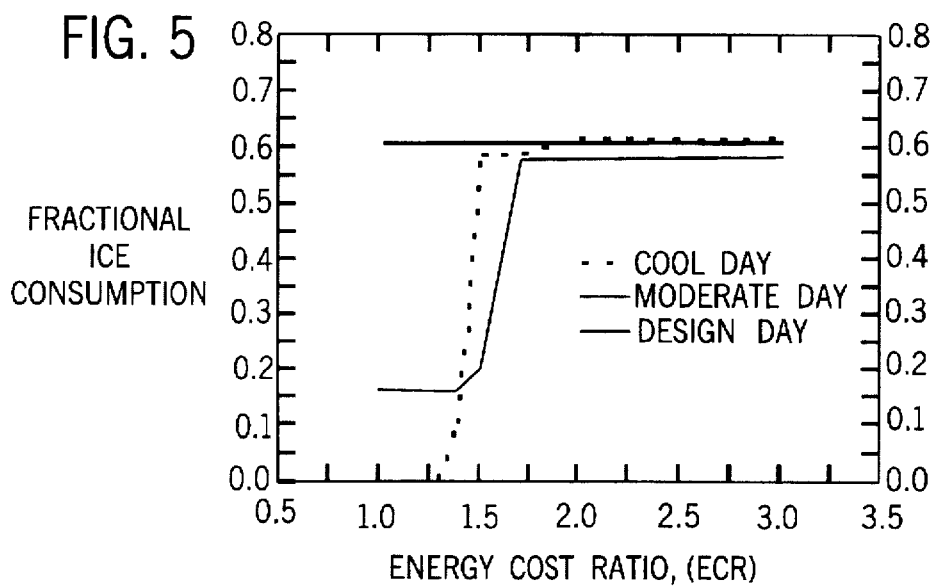
FIG. 5 is a graph illustrating fractional ice consumption as a function of site ECR.

Referring to FIG. 5, as the ECR increases from a low value to a higher value, a fraction of ice used may be determined as a function of ECR. At, for example an ECR value of 1, a minimum amount of ice is consumed since shifting the on-peak load does not lower energy costs. At a higher ECR value, energy costs are minimized by consuming all of the ice which can be produced off-peak (note for FIG. 5 that the off-peak time period was time limited resulting in a maximum fractional amount of ice produced, approximately 0.65. For particular system characteristics, including thermal storage system characteristics, building characteristics and for a variety of environmental conditions, it is possible to choose an ECR switchover point which allows for selecting one of two thermal control strategies, i.e., choosing between CPC or SPC priority. This is illustrated in FIG. 5 as the discontinuity at approximately ECR= 1.5. Hence at step 200, a site specific ECR ($ECR_{ss}$), based upon utility and system data, is evaluated against an estimated switchover ECR ($ECR_{sw}$). Where the $ECR_{ss}$ is larger than the $ECR_{sw}$ a control strategy which maximizes ice consumption is employed. Otherwise, a control strategy which minimizes ice consumption is employed. In testing, a worst case cost penalty of approximately 3 percent was observed as compared to optimal.

If $ECR_{ss}$ is larger than $ECR_{sw}$, the method proceeds to step 202 where an estimated demand cost is compared to a target demand cost (TDC). The estimated demand cost is obtained from a forecasting algorithm, and the initial TDC is obtained by implementing a load limiting control on the first day of the billing period as described below. The forecast used to estimate demand cost is not like the previously described forecasts in that the forecast length is much smaller (1–15 minutes) and suitable algorithms are known for such reduced time periods.

Figure 6:
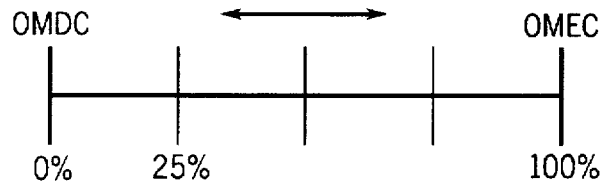
FIG. 6 is a line graph illustrating percentage of admissible demand costs relative to optimal.

Determining the TDC requires some analysis of optimal control scenarios. Evaluating a number of cooling load conditions to determine optimal trajectories (accomplished in the present invention via dynamic programming) it was found that the demand costs associated with the control which minimized the sum of the energy and demand costs, closely approached the demand cost associated with an optimal daily minimum demand control (OMDC) applied over a monthly optimization period. The range of possible demand costs are bounded by the demand costs attributed to a monthly implementation of OMDC and optimal minimum energy control (OMEC) strategies. The terminology "percent of admissible range" is used to specify the demand cost relative to the OMDC and OMEC demand costs and is illustrated in FIG. 6. Therefore a 25% range demand cost is located at the first quartile between the demand costs attributed to an OMDC and OMEC.

For the cooling load conditions evaluated, the mean of the demand costs was located at approximately 1.072% of the admissible range. The highest percentage (high ECR and low demand cost ratio, ratio of on-peak to off-peak demand charges) was 2.528% of admissible range and the lowest percentage (low ECR and high DCR) was 0.430% of admissible range. Thus on the first day of a billing period, the control should attempt to minimize demand costs without regard to energy costs. The resulting demand cost should then be used as the TDC for the next day and so on throughout the billing period. If it is not possible to keep the demand costs below the TDC, then the TDC for the next day should be set equal to the actual demand cost incurred for the day.

If the result of step 202 is that demand costs exceed the TDC, demand limiting is implemented and the method proceeds to step 204. That is, energy costs can be reduced by using ice, and it is desirable to switch to a SPC if the inventory of ice exceeds an estimate of the remaining integrated building cooling load. The ice inventory represents the amount of heat required to melt the remaining ice inside the tank. Most tank manufactures provide for measuring inventory. Therefore at step 204 if the ice inventory is sufficient to meet the remaining cooling load the method proceeds to step 208 and the rate of discharge of ice storage tank 18 is maximized.

If there is insufficient inventory to meeting the remaining cooling load, the method proceeds to step 206 where heuristics are applied to reduce demand costs. The desired result of step 206 is to use the ice storage and chiller together so that the demand costs will be maintained near, but below, the TDC. In the present invention a load limiting control (LLC) strategy is employed as it is effective at limiting demand. The LLC uses minimum possible chiller cooling rate so that the building load is satisfied and the entire ice inventory is depleted by the end of the occupied period. Step 206 also implements a velocity form of a proportional with integral reset feedback control (FBC) algorithm.

The feedback control strategy responds to fluctuations in the non-cooling related electrical power profile, i.e., non-cooling related power consumption, and maintains water chilling unit 20 cooling rate at the highest possible value consistent with maintaining the TDC.

In the present invention, the LLC and FBC are integrated to exploit the advantages of both. The LLC uses an estimate of future loads to provide a lowest possible chiller cooling rate consistent with depleting the inventory and satisfying the building load. Since it insures that the load will be met, it is used as a lower limit water chilling unit 20 cooling rate setpoint. The cooling rate calculated from the FBC is used as the active cooling rate setpoint for water chilling unit 20.

This is because the FBC better tracks electrical demand fluctuations and minimizes energy costs in most cases.

Figure 7:
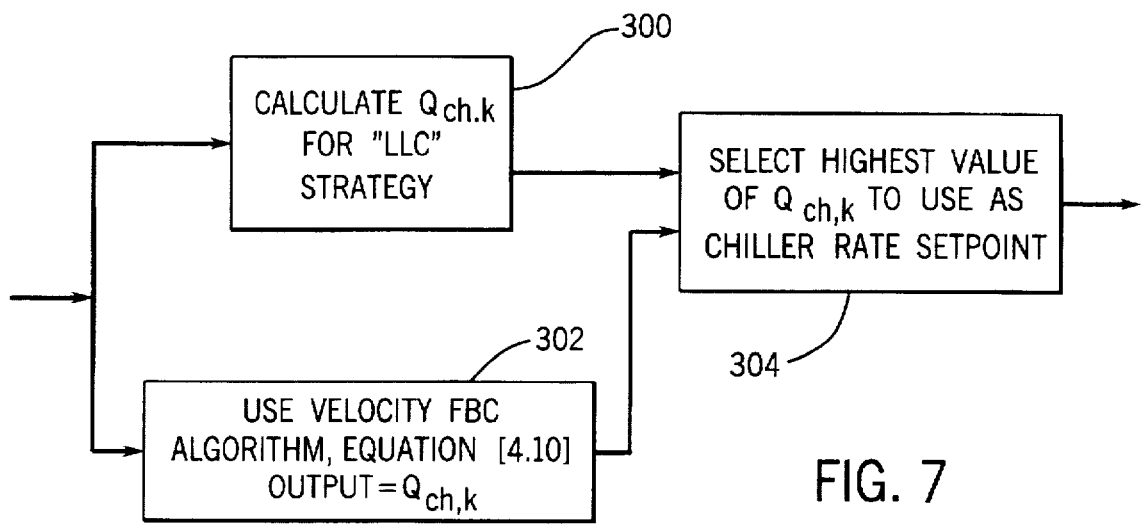
FIG. 7 is a flow chart of a preferred implementation of demand limiting.

As seen in FIG. 7, at each time interval, the water chilling unit 20 cooling rate setpoint from the LLC, step 300, and FBC, step 302, are compared. If the LLC cooling rate exceeds the FBC cooling rate, step 304, the LLC cooling rate is selected otherwise the FBC cooling rate is used.

If the result at step 202 is that demand costs are at or below the TDC the method proceeds to step 210. If the demand costs are below the TDC, in a preferred embodiment of the invention, SPC is given priority, and therefore at step 210 if there is sufficient ice inventory to meet cooling load, ice storage tank 18 is discharged at the maximum rate, step 214. Otherwise a CPC strategy is used, step 212, to meet cooling load primarily from operating water chilling unit 20. While not a specific outcome, implementing SPC at step 214 tends to minimize both energy and demand costs since in many cases the chiller does not operate and the energy costs are lowered sufficiently to offset the penalty of making ice.

If the result of step 200 is that melting ice does not reduce energy costs, then the method proceeds to step 216. At step 216 a similar decision as made at step 202 is made to determine if the demand costs are near the TDC. If the demand costs exceed the TDC, the method proceeds to step 220 and demand cost reduction strategies, such as set forth for step 206 are implement to reduce demand costs. If the demand costs are below the TDC then a CPC strategy is implemented at step 218.

During implementation, controller 40 will not have initial demand limiting control capability because the load forecasting algorithm does not have any deterministic data needed to estimate future loads. During a training period while such data is gathered, the system will require manual operation or operation under a simple strategy.

It will be appreciated that the present invention has been described in terms of preferred embodiments, and its teaching are not limited to the preferred embodiments described herein. The broad scope of the present invention will be appreciate by those skilled in the art from the subjoined claims.

We claim:

1. A controller for controlling a thermal storage system such that energy costs are minimized subject to demand costs, thereby reducing utility costs for a billing period, comprising:
   a first data structure for storing a utility rate structure having an on-peak energy rate and an off-peak energy rate that are designed to discourage high energy consumption during high energy demand periods;
   a second data structure for storing a target demand cost that is determined by minimizing the demand costs independent of the energy costs for a sub-period of the billing period;
   a memory having comparative rules that utilize a ratio of said on-peak energy rate to said off-peak energy rate and said target demand cost; and
   a processor connected to said memory that uses said comparative rules in order to select a control strategy for the thermal storage system, whereby the energy costs are minimized subject to the demand costs and the utility costs for the billing period are reduced.

2. The controller of claim 1, wherein said comparative rules also utilize an estimated demand cost that is obtained through short term forecasting.

3. The controller of claim 2, wherein said comparative rules provide for selection of a chiller priority control strategy if said estimated demand is less than said target demand cost and said thermal storage system is unable to meet a facility load requirement.

4. The controller of claim 2, wherein said comparative rules provide for selection of a storage priority control strategy if said estimated demand is less than said target demand cost and said thermal storage system is able to meet a facility load requirement.

5. The controller of claim 2, wherein said comparative rules provide for selection of a demand limiting control strategy if said estimated demand exceeds said target demand cost.

6. The controller of claim 2, wherein said comparative rules provide for selection of a load limiting control strategy if said estimated demand exceeds said target demand cost and said thermal storage system is able to meet a facility load requirement.

7. The controller of claim 2, wherein said comparative rules provide for selection of a storage priority control strategy if said estimated demand exceeds said target demand cost and said thermal storage system is unable to meet a facility load requirement.

8. The controller of claim 1, wherein said comparative rules provide for charging said thermal energy storage system at a maximum rate if said utility rate structure is not discouraging high energy consumption and the building is unoccupied.

9. The controller of claim 1, wherein said sub-period is the first twenty-four (24) hours of the billing period.

10. A method of controlling a thermal storage system such that energy costs are minimized subject to demand costs, thereby reducing utility costs for a billing period, comprising the steps of:
   receiving a utility rate structure having an on-peak energy rate and an off-peak energy rate that are designed to discourage high energy consumption during high energy demand periods;
   determining a target demand cost by minimizing the demand costs independent of the energy costs for a sub-period of the billing period;
   selecting a control strategy for the thermal storage system based at least in part on comparative rules that utilize a ratio of said on-peak energy rate to said off-peak energy rate and said target demand cost, whereby the energy costs are minimized subject to the demand costs and the utility costs for the billing period are reduced.

11. The method of claim 10, further comprising the step of generating an estimated demand cost.

12. The method of claim 11, wherein said step of generating an estimated demand cost is obtained through short term forecasting.

13. The method of claim 11, wherein said comparative rules provide for selection of a demand limiting control strategy if said estimated demand cost exceeds said target demand cost.

14. The method of claim 11, wherein said comparative rules provide for selection of a chiller priority control strategy if said estimated demand is less than said target demand cost and said thermal storage system is unable to meet a facility load requirement.

15. The method of claim 11, wherein said comparative rules provide for selection of a storage priority control strategy if said estimated demand is less than said target demand cost and said thermal storage system is able to meet a facility load requirement.

16. The method of claim 11, wherein said comparative rules provide for selection of a load limiting control strategy if said estimated demand exceeds said target demand cost and said thermal storage system is able to meet a facility load requirement.

17. The method claim 11, wherein said comparative rules provide for selection of a storage priority control strategy if said estimated demand exceeds said target demand cost and said thermal storage system is unable to meet a facility load requirement.

18. The method of claim 11, wherein said comparative rules provide for charging said thermal energy storage system at a maximum rate if said utility rate structure is not discourage high energy consumption and the building is unoccupied.

19. The controller of claim 10, wherein said sub-period is the first twenty-four (24) hours of the billing period.

* * * * *